3,087,965
PREPARATION OF N-ALKOXYMETHYL SUBSTITUTED AMIDES

Rostyslaw Dowbenko and Roger M. Christenson, Gibsonia, Pa., assignors to Pittsburgh Plate Glass Company, Pittsburgh, Pa., a corporation of Pennsylvania
No Drawing. Filed Dec. 2, 1960, Ser. No. 73,177
12 Claims. (Cl. 260—561)

This invention relates to the preparation of N-alkoxymethyl substituted unsaturated amides. More particularly, this invention relates to an improvement in the method of preparing N-alkoxymethyl substituted unsaturated carboxylic acid amides which comprises effecting a chemical interaction between an amide, an aldehyde and an alkanol, said improvement comprising first carrying out the reaction at an alkaline pH and subsequently adjusting the reaction mass to an acid pH while simultaneously adding more of said alkanol and then completing the reaction at said acid pH.

In copending application, Serial No. 775,380, filed November 21, 1958, there is disclosed a method for the preparation of lower N-alkoxymethyl substituted unsaturated amides. Said copending application discloses their preparation by the interaction of an unsaturated carboxylic acid amide, an aldehyde and a lower alkanol, wherein the reaction is conducted at a pH ranging from 3 to 6. Although this was the first time an N-alkoxymethyl substituted unsaturated amide was obtained as a pure compound, it was found, however, that this process could not be successfully extended to the preparation of N-methoxymethyl substituted unsaturated amide for commercial use. Although some of the desired compounds could be obtained by this method, the yields were low and the products were difficult to purify. The use of N-methylol substituted unsaturated amide as a starting material was investigated because it was thought side reactions produced impurities which cut down the yield of product; but this was also discounted as not being feasible because of the increased cost of handling and loss during isolation of the intermediate. Moreover, the intermediate was not of good purity.

Further work involving the use of N-methylol substituted unsaturated amide as set forth in British Patent 780,284 as starting material for the preparation of N-alkoxymethyl substituted unsaturated amide further substantiated these undesirable features, especially when applied to ethoxy and the higher alkoxy compounds. After thorough investigation of the above described methods, it was concluded that the yields of pure product are progressively poorer as the chain length of the alkanol is decreased when the methylolation is performed with the etherification, while the reverse is true when the methylolated derivatives are used as the starting material.

It has now been discovered that if the process set forth in the said application is modified in accordance with the instant invention, the alkoxy, particularly the methoxy through butoxymethyl acrylamide derivatives may be prepared uniformly in yields ranging from 85 to 95 percent.

An important feature of the invention resides in the fact that the methylolation is carried out in the presence of a very minimum amount of an alcohol of the type which is to be used for the ultimate etherification or with another suitable solvent; however, the initial purpose of its presence is not for etherification, but it is utilized as a reaction medium for the methylolation. Moreover, any side reactions such as the formation of reaction products between the formaldehyde and the alcohol are eliminated completely, or at least minimized. After the methylolation is completed the remaining amount of desired alcohol is added directly to the reaction medium for the subsequent etherification which is conducted at a different pH.

It is within the scope of the instant invention to employ inert polar solvents in place of the alcohol for the initial alkylolation; however, it is important to keep the solvent within the range of about 25 to about 100 grams per mole of acrylamide. Solvents which may be used in place of the alcohol include dioxane, tetrahydrofuran, dimethylformamide, dimethylacetamide, 1,2 - dimethoxyethane (Glyme), dibutyl ether, and methylene chloride.

The instant invention not only makes it possible to obtain yields of product which are better than those obtained using the prior art procedures, but also provides a process which can be utilized more easily than the process which uses the unstable methylolated derivatives as a starting material. In addition, isolation of the methylolated acrylamide inevitably results in loss of product and time which cuts down on efficiency and therefore significantly increases cost of preparation.

The reaction of the present invention is carried out by bringing together an unsaturated carboxylic acid amide, such as acrylamide, with formaldehyde, preferably about 1 mole to about 1.2 moles per mole of acrylamide, and a minimum amount of an alkanol (about 25 to 100 grams per mole of acrylamide) in an alkaline medium, preferably having a pH of about 9 to 10 and subsequently without isolation adding at least 100 grams per mole of acrylamide of the alkanol wherein the total amount of alcohol present is at least 250 grams per mole, and simultaneously converting to an acidic medium having a pH of about 3 to 5.

The reaction of an unsaturated carboxylic acid amide (methacrylamide), formaldehyde and butanol is described in U.S. Patent 2,173,005; however, the reaction as described in this patent produces an unnamed product which is described as being water-soluble. This product could not have been an N-alkoxymethyl methacrylamide, specifically N-butoxymethyl methacrylamide, inasmuch as will be seen hereinafter, authentic N-butoxymethyl methacrylamide is substantially water insoluble.

The reaction of an unsaturated carboxylic acid amide in an alkanol with formaldehyde under alkaline conditions (pH about 7.5 to 11, preferably 9 to 10) to form methylolated derivatives and subsequently without isolation further etherifying the methylolated product with the said alkanol under acidic conditions (pH 2.5 to 7, preferably 3.5 to 4.5) in the presence of a polymerization inhibitor may be represented generally by the following reaction equations wherein acrylamide is utilized for illustrative purposes:

Step 1:

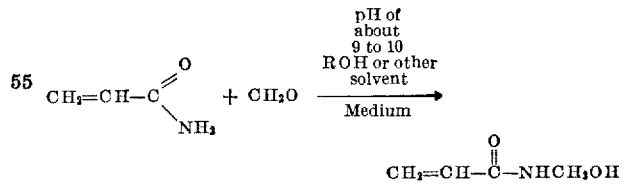

and without isolation of the product.

Step 2:

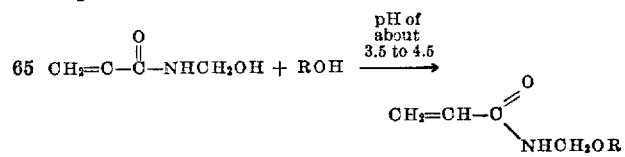

The reaction above depicted may proceed by first forming N-methylol acrylamide, which then reacts with the alcohol with the elimination of water.

In the above equations, R represents an alkyl radical, and preferably a lower alkyl radical.

Because of the nature of the reactants employed in producing N-alkoxymethyl unsaturated amides in accordance with this invention, a number of reactions other than the desired reaction may occur, and the fact that several do actually occur has been firmly established. Among other possible reactions are the following:

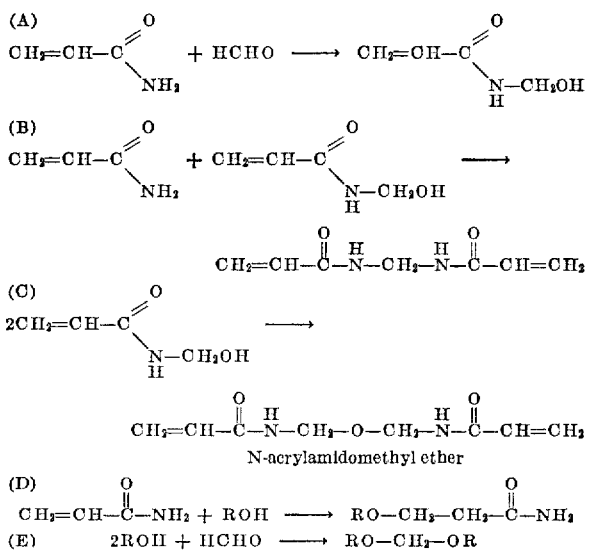

(D)
$$CH_2=CH-\overset{O}{\underset{\parallel}{C}}-NH_2 + ROH \longrightarrow RO-CH_2-CH_2-\overset{O}{\underset{\parallel}{C}}-NH_2$$

(E)
$$2ROH + HCHO \longrightarrow RO-CH_2-OR$$

In addition to the foregoing reactions, polymerization of the amide utilized in the reaction and/or the desired N-alkoxymethyl unsaturated amide product may occur. Fortunately, conditions have been found which suppress to a considerable extent the above side reactions and result in good yields of the desired product.

The unsaturated amide which is reacted with formaldehyde and an alkanol in accordance with the present invention possesses the general structure:

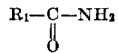

wherein $R_1$ is an aliphatic radical containing a single polymerizable double bond. Preferably, the double bond in the radical $R_1$ is in the alpha-beta position with respect to the carbonyl group in the above structure. The particularly preferred amides are those in which the double bond in addition to being alpha-beta to the carbonyl group is also a terminal double bond. Examples of the amides which may be employed include acrylamide, methacrylamide, alpha-cyano acrylamide, alpha-chloro acrylamide, crotonamide, the mono- or diamide of itaconic acid or fumaric acid, and the like. Preferably, the radical $R_1$ contains from 2 to 6 carbon atoms. For reasons of availability and low cost, acrylamide is the preferred monomer for use in the reaction of this invention.

It is a useful feature of this reaction that the unsaturated amide starting material does not necessarily have to be in a pure form. For example, it is possible to utilize the crude reaction mixture obtained by reacting acrylonitrile with aqueous sulfuric acid without first isolating the acrylamide from the reaction mixture as a crystalline compound.

The formaldehyde employed in the reaction may be in several forms; for example, polymers of formaldehyde such as paraformaldehyde or trioxymethylene may be used. It is also possible, and in fact convenient, to utilize a solution of formaldehyde in the alkanol utilized to form the alkoxy portion of the desired product. Solutions of formaldehyde in alcohols are known commercially as "Formcels." For example, the product known as butyl Formcel contains approximately 40 percent formaldehyde, 53 percent butyl alcohol and 7 percent water. It should be kept in mind, however, that in the instant invention the initial charge of alcohol is just enough to provide a medium for the reaction of the acrylamide with the formaldehyde; therefore, the formaldehyde-alcohol solution contains a higher concentration of formaldehyde. Other aldehydes, however, including acetaldehyde, butyraldehyde, furfural, and the like, preferably containing only atoms of carbon, hydrogen and oxygen, can be used.

Any alkanol of the structure ROH, wherein R is an alkyl radical, can be reacted with the unsaturated amide formaldehyde reaction product to produce N-alkoxymethyl substituted unsaturated amides. For example, such alcohols include methyl alcohol, ethyl alcohol, propyl alcohol, isopropyl alcohol, butyl alcohol, isobutyl alcohol, amyl alcohol, octyl alcohol, decyl alcohl, octadecyl alcohol, allyl alcohol, and the like. Preferably, however, a lower alcohol having from 1 to 8 carbon atoms, and particularly butyl alcohol, is utilized. In addition to the aliphatic alcohols, the reaction products of ethylene glycol with these alcohols (Cellosolves) may be utilized.

The N-alkoxymethyl unsaturated carboxylic acid amides which are considered to be within the scope of the instant invention may be represented by the structure:

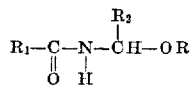

wherein R is an alkyl radical, preferably lower alkyl (1 to 8 carbon atoms), or an alkoxyethyl radical, $R_1$ is an unsaturated aliphatic radical, preferably containing not more than 6 carbon atoms, and $R_2$ is hydrogen or a lower alkyl radical.

As indicated hereinabove, the reaction of the carboxylic acid amide, an aldehyde and the appropriate alcohol is carried out firstly under alkaline conditions, preferably in the pH range of about 9 to 10 and is carried out secondly under acidic conditions, preferably at a pH value ranging from about 3.5 to 4.5 wherein the original amount of the alcohol is complemented with at least enough of the same alcohol to provide a medium to fully etherify the methylolated amide, and which is added simultaneously with the pH change. Almost any alkaline substance may be used to maintain the pH of the reaction medium on the alkaline side. For instance, any one of a wide variety of alkaline earth and alkaline metal, oxides, hydroxides, carbonates, various amines which include both primary, secondary and tertiary derivatives, quaternary ammonium salts thereof, and the various amidogen or ammonium derivatives, such as urea, the amino triazines, guanamine, and the alkyl-substituted guanamines.

Equally as broad are the acidic substances which may be used to adjust the pH of the reaction medium to a value of between 3.5 and 4.5. These can include any one of a large variety of mineral acids, such as sulfuric acid, phosphoric acid, hydrochloric acid, and the like, and any one of a large variety of organic acids, such as oxalic acid, citric acid, tartaric acid, and the like, as may also any one of a large variety of substances which tend to ionize or hydrolyze in an aqueous medium to form hydrogen ions, such as the various phenols and acidic oxides.

In order to prevent polymerization of the unsaturated amide reactant and/or the polymerizable product, and thus insure highest possible yields of the desired product, it is important that a polymerization inhibitor be present in the reaction mixture. Commercially available polymerizable amides, such as acrylamide and methacrylamide, may contain such inhibitors; however, it is generally desirable to add additional inhibitors prior to or during the course of the reaction. A particularly useful class of inhibitors for this purpose includes the quaternary ammonium salts such as the following compounds:

Trimethylbenzyl ammonium acetate
Trimethylbenzyl ammonium chloride
Trimethylbenzyl ammonium bromide
Triethylbenzyl ammonium chloride
Tripropylbenzyl ammonium chloride
Tributylbenzyl ammonium chloride
Cetyl trimethyl ammonium chloride
Octadecyl trimethyl ammonium chloride
Trimethylbenzyl ammonium sulfate
Lauryl pyrdinium chloride
Phenyl trimethyl ammonium chloride
Tolyl trimethyl ammonium chloride
Benzyl trimethyl ammonium phosphate
Benzyl trimethyl ammonium iodide
Ethyl pyridinium chloride
Phenyl trimethyl ammonium chloride
Octyl trimethyl ammonium bromide
Ethylene bis(pyridinum chloride)
Ethylene bis(trimethyl ammonium bromide)
Trimethylbenzyl ammonium oxalate
Trimethylbenzyl ammonium malate
Trimethylbenzyl ammonium tartrate
Trimethylbenzyl ammonium lactate Other polymerization inhibitors such as hydroquinone, pyrogallol, the monomethyl ether of hydroquinone, tertiary butyl catechol, 2,5-di-tertiary butyl hydroquinone, and the like, may also be employed with good results. Amines such as N,N'-diphenyl-phenylene diamine and para-hydroxy diphenylamine can also be utilized.

In recovering the products obtained by the process of the present invention, particularly those which are water soluble, a flash distillation is best suited for purification of the products. If samples larger than 60 to 80 grams are to be distilled, it is quite important to flash distill because of decomposition and polymerization problems. This consists in adding the distillate dropwise to a heated and evacuated flask at such a rate as to permit the almost instantaneous vaporization without any appreciable collection of liquid in the distilling flask. If the crude N-alkoxymethyl acrylamides are distilled in the usual way under vacuum, only low recoveries of products are obtained, especially with the lower compounds which have not been washed with water because of their solubility. The flash distilled N-alkoxymethyl acrylamides can then be distilled in the usual way to obtain analytically pure samples which are obtained as colorless, viscous, high boiling oils which show a tendency to polymerize and decompose at higher temperatures (about 90 to 100° C.). Except for N-butoxy and N-isobutoxy compounds, they are soluble in water but insoluble in hydrocarbon solvents. Similarly, N-butoxymethyl methacrylamide is also insoluble in water. These compounds therefore can be purified with water washing in lieu of flash distillation.

The following examples illustrate in detail the preparation of the N-alkoxymethyl substituted unsaturated carboxylic acid amides. In accordance with the instant invention, the examples are given by way of illustration and not by way of limitation. All parts and percentages are by weight unless otherwise specified.

EXAMPLE I

This example describes the preparation of N-methoxymethyl acrylamide.

|  | Parts by weight |
|---|---|
| Acrylamide | 142 |
| Paraformaldehyde (91 percent) | 66 |
| Methanol | 50 |

The above ingredients were admixed and charged into a flask. The pH was adjusted to 9.8 with a 50 percent aqueous sodium hydroxide solution. The temperature was raised to 50° C. and maintained for 2½ hours. Eight hundred (800) parts more methanol were then added. The pH was adjusted to a value of 4 with a 30 percent sulfuric acid methanol solution. Two (2) parts hydroquinone were added and the mixture was taken to reflux at 67° C. and maintained for 7 hours. The reaction mass was then adjusted to a pH of 8 with sodium bicarbonate and filtered through Celite (diatomaceous earth). A small amount of hydroquinone was then added and the filtrate evaporated down on a house vacuum and steam bath. Two hundred and twenty-one (221) parts of product, amounting to a 90.6 percent yield, were obtained. A 70 percent yield was obtained after flash distillation.

EXAMPLE II

This example relates to the preparation of N-ethoxymethyl acrylamide.

|  | Parts by weight |
|---|---|
| Acrylamide | 71 |
| Paraformaldehyde (91 percent) | 36.3 |
| Ethanol | 25 |

The above ingredients were admixed and charged into a flask, adjusted to a pH of 9.1 with a 50 percent aqueous sodium hydroxide solution, heated to a temperature of 50° C. and maintained for 3 hours. Four hundred and fifty (450) more parts of methanol were then added to the reaction mixture and the pH was adjusted to a value of 4 with a 30 percent sulfuric acid methanol solution. One (1) part hydroquinone was added and the reaction mass was taken to reflux at 78° C. for 7 hours. The pH was adjusted to a value of 7 with sodium bicarbonate and the product was filtered through Celite. A little hydroquinone was then added and the mixture was evaporated down on house vacuum and steam bath. One hundred and seventeen (117) parts, which amounted to a yield of 91 percent of product, were obtained. A 79 percent yield was obtained after flash distillation.

EXAMPLE III

This example relates to the preparation of N-propoxymethyl acrylamide.

|  | Parts by weight |
|---|---|
| Acrylamide | 71 |
| Paraformaldehyde | 31.6 |
| N-propyl alcohol | 25 |

The above ingredients were admixed and charged into a flask. The pH was adjusted to a value of 9 with a 50 percent aqueous sodium hydroxide solution, and the temperature of the reaction mass was adjusted to 50° C. and maintained for 2 hours, after which 590 parts N-propyl alcohol were added. The pH was adjusted with a 30 percent sulfuric acid N-propyl alcohol solution to a value of 4.2. One (1) part hydroquinone was added and the temperature was heated to reflux (96° C.) and maintained for 7 hours. The pH was adjusted to a value of 7.3 by sodium bicarbonate, filtered through Celite and evaporated down on house vacuum and steam bath in the presence of 1 part more hydroquinone. One hundred thirty-three (133) parts (94 percent) product were obtained. Nitrogen content 9.36; refractive index $n_D^{29}$ 1.4622. A yield of 75 percent was obtained after a flash distillation of the product.

EXAMPLE IV

The following is the preparation of N-isopropoxymethyl acrylamide.

|  | Parts by weight |
|---|---|
| Acrylamide | 71 |
| Paraformaldehyde (91 percent) | 33 |
| Isopropyl alcohol | 35 |

The above ingredients were admixed and charged into a flask. The pH of the reaction mixture was adjusted to a value of 9.3 with a 50 percent aqueous sodium hydroxide solution. The temperature was raised to 50° C. and held for 2 hours, after which 590 parts isopropyl alcohol were added to the reaction mass. The pH was then adjusted to a value of 4.2 with a 30 percent sulfuric acid-isopropyl alcohol solution. One (1) part hydroquinone was added and the reaction mass was brought to reflux for 7 hours at 84° C. The pH was then adjusted to a value of 7 with sodium bicarbonate and the resulting product was filtered through Celite and evaporated in the presence of 1 part more hydroquinone. A viscous, yellow oil identified as N-isopropoxymethyl acrylamide was obtained. One hundred and thirty-eight (138) parts of this product were obtained, which was equivalent to 97 percent yield (nitrogen content 9.39 percent). A 70 percent yield was obtained after flash distillation of the product.

EXAMPLE V

This example relates to the preparation of N-butoxymethyl acrylamide.

| | Parts by weight |
|---|---|
| Acrylamide | 142 |
| Paraformaldehyde | 63.2 |
| Butanol | 50 |

The above ingredients were admixed and charged into a flask heated to 50° C. and adjusted to a pH of 9 with a butanol solution of sodium hydroxide. After 1 hour, the pH was adjusted to 9 and the reaction mass was agitated for 4 more hours at 50° C., after which 741 parts of butanol and 200 parts of benzene were added. The reaction mass was then adjusted to a pH of 5 with a 30 percent sulfuric acid butanol solution. Two (2) parts of hydroquinone were then added and the mixture was heated to reflux at 96° C. for 3 hours and 40 minutes. The product was then washed with an aqueous sodium chloride solution eight times. A small amount of hydroquinone was added to the product which was evaporated under a vacuum on a steam bath. Two hundred and seventy-seven (277) parts product were obtained, which was equivalent to an 88.5 percent yield. After flash distillation, a pure product having a refractive index $n_D^{25}$ of 1.4594, nitrogen 8.28, was obtained in a yield of 82 percent.

EXAMPLE VI

The following example is concerned with the preparation of N-isobutoxymethyl acrylamide.

| | Parts by weight |
|---|---|
| Acrylamide | 71 |
| Paraformaldehyde (91 percent) | 33 |
| Isobutyl alcohol | 35 |

The above ingredients were admixed and charged into a flask, the pH was adjusted to a value of 9.7 with a 50 percent sodium hydroxide aqueous solution. The reaction mixture was then adjusted to a temperature of 50° C. and maintained for 2½ hours. Seven hundred and thirty (730) more parts of isobutyl alcohol were then added and the pH was adjusted to a value of 4.3 with a 30 percent sulfuric acid isobutyl alcohol solution. One (1) part hydroquinone was added and the reaction mass was heated to a temperature of 85° C. and maintained for 7 hours. The resulting product was washed four times with water and once with sodium chloride solution. A little hydroquinone was then added and evaporation on house vacuum and steam bath was performed. A 64 percent yield of N-isobutoxymethyl acrylamide was obtained. A 48 percent yield was obtained after a flash distillation.

EXAMPLE VII

The following example relates to the preparation of N-allyloxymethyl acrylamide.

| | Parts by weight |
|---|---|
| Acrylamide | 71 |
| Paraformaldehyde (91 percent) | 33 |
| Allyl alcohol | 25 |

The above ingredients were admixed and charged into a flask. The reaction mass was then adjusted to a pH of 9.5 with a 50 percent aqueous sodium hydroxide solution. The temperature of the reaction mass was then raised to 50° C. and maintained for 2½ hours, after which was added 580 parts more of allyl alcohol. The pH was then adjusted to 3.5 with a 30 percent sulfuric acid methanol solution. One (1) part hydroquinone was added and the reaction mass was then heated to 85° C. and maintained for 7 hours with constant agitation. The reaction mixture was then adjusted to a pH of 7.1 and the sodium bicarbonate filtered through Celite. Hydroquinone was then added and the reaction mass was then evaporated down on house vacuum and steam bath. One hundred twenty-eight (128) parts of N-allyloxymethyl acrylamide were obtained. This was equivalent to a 90 percent yield. A 69 percent yield was obtained after flash distillation.

EXAMPLE VIII

The following example is concerned with the preparation of N-butoxymethyl methacrylamide.

| | Parts by weight |
|---|---|
| Methacrylamide | 85.1 |
| Paraformaldehyde (91 percent) | 33 |
| Butanol | 50 |

The above ingredients were admixed and charged into a flask. The pH was adjusted to a value of 9.4 with a 50 percent aqueous sodium hydroxide solution. The mixture remained solid, which made it necessary to add more sodium hydroxide solution and which raised the pH to a value of 10.2. The reaction mixture was then taken to a temperature of 50° C. and maintained for 4 hours under agitation. Seven hundred and forty-one (741) parts more butanol were added to the reaction mass. The pH was adjusted to a value of 4.5 with a 30 percent sulfuric acid butanol solution. Two hundred (200) parts benzene were added with 1 part hydroquinone and the mixture was taken to reflux at 95° C. and maintained for 7 hours. As water was removed, the temperature rose to 100° C. The resulting product was washed four times with water. One (1) part hydroquinone was added and evaporation on house vacuum and steam bath was then performed. One hundred and twenty (120) parts product were recovered, which amounted to a yield of 70 percent. A 62 percent yield was obtained after flash distillation.

Analytical samples of the products of Examples I through VIII were prepared by several redistillations in a short path distillation apparatus and the middle fractions were used. In one instance the products from the reaction of acrylamide, formaldehyde and butanol were carefully examined for the presence of acrylamidomethyl ether and dibutyl formal. While none of the former compound could be found in the aqueous layer, there was obtained a small amount of a liquid having a boiling point of 155 to 157° C., apparently impure dibutyl formal. Similar results were obtained in the corresponding reaction with methanol and no dimethyl formal was obtained. The melting points of the compounds were obtained by freezing a 50 to 25-gram sample in Dry Ice and allowing it to warm up slowly with stirring by a thermometer to the desired temperature. The temperature at which the compound became soft and at which all solid melted was taken at the melting point. The densities were determined at 25° C. with a 10-milliliter pycnometer and were calculated from the formula:

$$d = \frac{W_C}{W_W \times 0.9971}$$

where $W_C$ = weight of compound and
$W_W$ = weight of water

Molar refractions were calculated using the Lorentz-Lorenz formula.

The analytical data for the products of the above examples are consolidated in Table I.

*Table I*

| Example No. | Boiling Point, °C. at (mm. of Hg) | Melting Point, °C. | Refractive Index, $n_D^{25}$ | Density at 25°C., $D^{25}$ | Empirical Formula | Motor Refraction | | Analysis | | | | | |
|---|---|---|---|---|---|---|---|---|---|---|---|---|---|
| | | | | | | | | Carbon | | Hydrogen | | Nitrogen | |
| | | | | | | Calculated | Found | Calculated | Found | Calculated | Found | Calculated | Found |
| I | 91–2(0.1) | –3 to 1 | 1.4714 | 1.0538 | $C_5H_9NO_2$ | 30.08 | 30.58 | 52.16 | 53.44, 53.61 | 7.88 | 8.07, 7.95 | 12.17 | 12.58, 12.59 |
| II | 94–6(0.1) | 6 to 9 | 1.4673 | 1.0192 | $C_6H_{11}NO_2$ | 34.70 | 35.18 | 55.79 | 56.18, 56.39 | 8.59 | 8.96, 8.80 | 10.85 | 11.65, 11.69 |
| III | 87–8(0.01) | 8 to 11 | 1.4649 | 0.9915 | $C_7H_{13}NO_2$ | 39.32 | 39.91 | 58.72 | 58.96, 59.06 | 9.15 | 9.31, 9.20 | 9.79 | 9.65, 9.74 |
| IV | 82–3.5(0.01) | 15 to 18 | 1.4621 | 0.9867 | $C_7H_{13}NO_2$ | 39.32 | 39.91 | 58.72 | 58.74, 59.00 | 9.15 | 9.29, 9.17 | 9.79 | 9.85, 9.91 |
| V | 110–2(0.03) | –9 to –6 | 1.4613 | 0.9693 | $C_8H_{15}NO_2$ | 43.93 | 44.54 | 61.12 | 61.31, 61.53 | 9.62 | 9.77, 9.94 | 8.91 | 8.61, 8.88 |
| VI | 99–100(0.03) | (¹) | 1.4588 | 0.9654 | $C_8H_{15}NO_2$ | 43.93 | 44.51 | 61.12 | 61.05, 61.20 | 9.62 | 9.52, 9.69 | 8.91 | 8.73, 8.74 |
| VII | 105–9(0.02) | –1 to 1 | 1.4821 | 1.0303 | $C_7H_{11}NO_3$ | 38.85 | 39.06 | 59.55 | 58.33, 58.48 | 7.86 | 8.02, 7.95 | 9.92 | 10.22, 10.11 |
| VIII | 83–7(0.08) | 2 to 4 | 1.4619 | 0.9649 | $C_9H_{17}NO_2$ | 48.55 | 48.79 | 63.12 | 63.20, 63.22 | 10.01 | 10.08, 10.10 | 8.18 | 8.19, 8.11 |

¹ Not crystallizing above –65°, but solidifying to a clear glass.

EXAMPLE IX

This example relates to the preparation of N-butoxymethyl acrylamide using the improved method of preparation of the instant invention.

| | Parts by weight |
|---|---|
| Acrylamide | 67 |
| Formaldehyde (91 percent paraformaldehyde) | 29.8 |
| n-Butanol | 23.6 |

The above ingredients were charged into a suitable vessel and heated to 113° F. The pH of the reaction mixture was adjusted to 9.3 and taken to 122° F. for 4 hours, after which 350 parts of n-butanol and 83 parts of toluene were added. After 20 minutes, the temperature dropped to 105° F. and the pH was adjusted to 3.5 with a 50 percent solution of phosphoric acid ($H_3PO_4$). One (1) part of hydroquinone was added and the reaction mixture was azeotropically distilled for 10 hours and cooled to 90° F. The pH was then adjusted to 6.5 with a 50 percent alkaline solution. The vessel was placed under vacuum (60 to 160 millimeters) and heated to 200° F.

Yield (percent) _____ 95
Nitrogen (percent) _____ 8.92

EXAMPLE X

This example relates to the preparation of N-butoxymethyl acrylamide using the process set forth in the aforementioned copending application, Serial No. 775,380.

| | Parts by weight |
|---|---|
| Acrylamide | 85.2 |
| Butyl formcel | 198 |
| n-Butanol | 360 |
| Hydroquinone | 1.9 |

The above ingredients were charged into a vessel and heated to 216 to 220° F., refluxed for 3 hours until the temperature dropped to 205° F., and 240 parts of water were added with agitation for 15 minutes. The agitation was turned off for 2 hours, after which the water was removed. This washing was repeated two more times. The vessel was then placed under vacuum (45 to 100 millimeters) and heated for 5 hours until the pot temperature reached 212° F.

Yield (percent) _____ 68
Nitrogen (percent) _____ 8.92

We claim:

1. A method of preparing compounds of the formula:

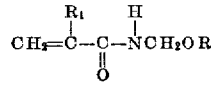

$$CH_2=\overset{R_1}{\underset{}{C}}-\overset{H}{\underset{\underset{O}{\|}}{C}}-NCH_2OR$$

wherein R is a member of the class consisting of alkyl of from 1 to 8 carbon atoms and alkoxyethyl, and $R_1$ is a member of the group consisting of hydrogen and lower alkyl, which comprises reacting an unsaturated amide of the formula:

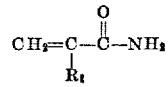

$$CH_2=C-\overset{O}{\underset{\underset{R_1}{}}{\overset{\|}{C}}}-NH_2$$

with an alcohol of the formula:

ROH wherein R and $R_1$ have the same meanings set forth above, and formaldehyde in the presence of from about 25 grams to about 100 grams per mole of the amide of an alkanol, maintaining the pH of the reaction mixture between about 7.5 and about 11 until substantially all of the unsaturated amide has been reacted with the formaldehyde, then adding at least about 100 grams per mole of the amide of said alkanol, readjusting the pH of said reaction mixture to a value ranging from about 2.5 to about 7, and heating said reaction mixture in the presence of a polymerization inhibitor until substantially all of the methylolated groups have been etherified.

2. The method of claim 1 wherein the amide is acrylamide.

3. The method of claim 2 wherein said alkanol is methanol.

4. The method of claim 2 wherein said alkanol is ethanol.

5. The method of claim 2 wherein said alkanol is propanol.

6. The method of claim 2 wherein said alkanol is isopropanol.

7. The method of claim 2 wherein said alkanol is butanol.

8. The method of claim 1 wherein the amide is methacrylamide.

9. The method of claim 8 wherein the alkanol is butanol.

10. The method set forth in claim 1 wherein the pH of the reaction is firstly adjusted to a value ranging between 9 and 10, and simultaneously readjusted to a value ranging from about 3.5 to about 4.5 with the addition of the alkanol.

11. The method set forth in claim 1 wherein the unsaturated amide is acrylamide.

12. A method as in claim 1 in which form about 1 to about 1.2 moles of formaldehyde per mole of amide are used.

References Cited in the file of this patent

UNITED STATES PATENTS

| | | |
|---|---|---|
| 2,361,185 | Engelmann et al. | Oct. 24, 1944 |
| 2,523,934 | Albrecht et al. | Sept. 26, 1950 |
| 2,576,501 | Dalton | Nov. 27, 1951 |
| 2,760,977 | Feuer et al. | Aug. 28, 1956 |
| 2,773,063 | Specht et al. | Dec. 4, 1956 |
| 2,810,713 | Melamed | Oct. 22, 1957 |
| 2,927,942 | Bikaler et al. | Mar. 8, 1960 |
| 2,993,903 | Kraus | July 25, 1961 |
| 2,999,881 | Gleckler et al. | Sept. 12, 1961 |

UNITED STATES PATENT OFFICE
CERTIFICATE OF CORRECTION

Patent No. 3,087,965                          April 30, 1963

Rostyslaw Dowbenko et al.

It is hereby certified that error appears in the above numbered patent requiring correction and that the said Letters Patent should read as corrected below.

Columns 9 and 10, Table I, for the heading "Motor Refraction" read -- Molar Refraction --; column 11, line 12, for the claim reference numeral "1" read -- 10 --.

Signed and sealed this 22nd day of September 1964.

(SEAL)
Attest:

ERNEST W. SWIDER
Attesting Officer

EDWARD J. BRENNER
Commissioner of Patents